United States Patent
Röhr (10) Patent No.: US 9,056,259 B2
(45) Date of Patent: *Jun. 16, 2015

(54) MODEL HELICOPTER CONTROL AND RECEIVING MEANS

(75) Inventor: Ulrich Röhr, Hanau (DE)

(73) Assignees: MIKADO MODEL HELICOPTERS GMBH, Potsdam (DE); Ulrich Röhr, Hanau (DE)

( * ) Notice: Subject to any disclaimer, the term of this patent is extended or adjusted under 35 U.S.C. 154(b) by 719 days.

This patent is subject to a terminal disclaimer.

(21) Appl. No.: 12/698,665

(22) Filed: Feb. 2, 2010

(65) Prior Publication Data

US 2010/0210169 A1 Aug. 19, 2010

(30) Foreign Application Priority Data

Feb. 4, 2009 (DE) ...................... 20 2009 001 355 U (51) Int. Cl.
A63H 27/00 (2006.01)
A63H 27/133 (2006.01)
(Continued)

(52) U.S. Cl.
CPC ................ *A63H 30/04* (2013.01); *A63H 27/12* (2013.01); *G05D 1/0033* (2013.01)

(58) Field of Classification Search
CPC ....... A63H 27/02; A63H 27/12; A63H 30/04; G05D 1/085; G05D 1/0808; B64C 2203/00
USPC ............. 701/3, 8, 529; 340/979, 679, 825.69; 244/194; 455/103
See application file for complete search history.

(56) References Cited

U.S. PATENT DOCUMENTS

| 5,238,203 A | 8/1993 | Skonieczny et al. |
| 5,299,759 A | 4/1994 | Sherman et al. |
| 5,322,469 A | 6/1994 | Tilbor |

(Continued)

FOREIGN PATENT DOCUMENTS

| DE | 3437297 | 4/1986 |
| DE | 29805401 | 7/1998 |

(Continued)

OTHER PUBLICATIONS

International Search Report for Application No. PCT/EP2010/000596 dated Oct. 21, 2010.

(Continued)

*Primary Examiner* — Steven J Hylinski
(74) *Attorney, Agent, or Firm* — RatnerPrestia (57) ABSTRACT

A control system for a remote-controlled device comprising at least one receiver configured to receive a plurality of control channel signals and an operational control unit. The operational control unit comprises at least one receiver input connected to the receiver via a high speed digital link. The input is configured to receive a sequence of digital packets of information from the receiver. This input may contain information relating to the plurality of control channels including at least one user input signal. The operational control unit also includes a sensor input for receiving signals from a sensor located on the device. The operational control unit includes a processor capable of processing the data. The operational control unit will include at least one output for transmitting an output signal to a mechanism for controlling operation of the device. This device may be specifically designed to work with remote-controlled helicopters.

35 Claims, 7 Drawing Sheets

(51) Int. Cl.
*A63H 30/04* (2006.01)
*G05D 1/00* (2006.01)

(56) References Cited

U.S. PATENT DOCUMENTS

| | | | |
|---|---|---|---|
| 5,597,138 | A | 1/1997 | Arlton et al. |
| 5,749,540 | A | 5/1998 | Arlton |
| 6,053,452 | A | 4/2000 | Yamakawa et al. |
| 6,751,529 | B1* | 6/2004 | Fouche ............................ 701/3 |
| 6,804,511 | B1 | 10/2004 | Kakinuma |
| 1,314,747 | A1 | 8/2011 | Rohr |
| 8,049,600 | B2 | 11/2011 | Beard |
| 2003/0043053 | A1* | 3/2003 | Schuckel ................ 340/825.69 |
| 2004/0245378 | A1 | 12/2004 | Nonami |
| 2006/0102777 | A1 | 5/2006 | Rock |
| 2006/0264185 | A1* | 11/2006 | Jorgensen .................... 455/103 |
| 2007/0030174 | A1* | 2/2007 | Randazzo et al. ............ 340/979 |
| 2007/0032923 | A1* | 2/2007 | Mossman et al. ................. 701/4 |
| 2007/0093945 | A1 | 4/2007 | Grzywna |
| 2007/0162196 | A1* | 7/2007 | Nonami et al. ................... 701/3 |
| 2008/0036617 | A1* | 2/2008 | Arms et al. .................... 340/679 |
| 2008/0097658 | A1* | 4/2008 | Shue et al. ........................ 701/8 |
| 2008/0249672 | A1 | 10/2008 | Cherepinsky |
| 2008/0269988 | A1 | 10/2008 | Feller |
| 2009/0012658 | A1 | 1/2009 | Cherepinsky et al. |
| 2009/0242691 | A1 | 10/2009 | Wittmer |
| 2009/0262002 | A1 | 10/2009 | Alexander |
| 2010/0003886 | A1 | 1/2010 | Cheng |
| 2010/0004802 | A1 | 1/2010 | Bodin |
| 2010/0023186 | A1 | 1/2010 | Sahasrabudhe et al. |
| 2010/0210169 | A1 | 8/2010 | Rohr |
| 2012/0169484 | A1 | 7/2012 | Rohr |

FOREIGN PATENT DOCUMENTS

| | | |
|---|---|---|
| DE | 29810356 | 8/1998 |
| GB | 1118117 | 6/1968 |
| WO | WO 96/06006 A1 | 2/1996 |
| WO | WO 2005/100154 A1 | 10/2005 |
| WO | WO 2008/048245 A2 | 4/2008 |

OTHER PUBLICATIONS

HeliCommand Instruction Manual, Version 1.6, Dec. 2006.
Instruction Manual for the Pro RC Flybarless System, Jan. 2009.
MikroKopter Flight-Ctrl V1.0 manual, May 2, 2007, 14 pages, www.MikroKopter.com; English translation, 18 pages, http://www.mikrokopter.de/ucwiki/en/FlightCtrlManual?action=print.
Spektrum DX7/AR7000 mit MK platine interfacen, 12 pages, http://forum.mikrokopter.de/topic-1144.html; Posts dated Jun. 8, 2007-Jan. 16, 2009, and English Translation, "Spectrum DX7/AR7000 with MK board interfacen," 16 pages, http://translate.google.com/translate; retrieved on Feb. 7, 2013.
RC Groups, "Getting PPM output from a Spektrum RX without any PPM stage," Posts dated Jul. 16, 2007-Aug. 22, 2009, 15 pages, http://www.rcgroups.com/forums/showthread.php2t=714299.
Thunder Tiger Europe GmbH, "Elektronische Rotorkopf-Stabilisierung für jedermann!" Thunder Tiger Newsletter Nov. 28, 2008, 1 page and English translation, 1 page.
AC-Helistore, "RONDO V2 Rotorkopf-Stabilisierung, Thunder Tiger," Feb. 10, 2010, 3 pages, and English translation, 1 page.
Adaptive Flight-13 Unmanned Aerial Vehicle Guidance, Navigation, and Control Systems, 1 page, http://www.adaptiveflight.com/news.html; News reports dated Sep. 2008-Mar. 5, 2009.
Holzapfel, Florian, "Nonlinear Adaptive Control of an Unmanned Aerial Vehicle," Jun. 8, 2004, 282 pages, and English Abstract, 2 pages.
US Office Action for U.S. Appl. No. 13/147,475, dated Sep. 15, 2014, 28 pp.
Notice of Allowance for U.S. Appl. No. 13/147,475, dated Jan. 28, 2015, 15 pp.
US. Office Action for Application No. 13/147,475 dated May 22, 2014.
ProRC, "Instructions Manual for the Pro RC Flybarless System Rondo," 26 pp., pdf file created Jan. 7, 2009, downloaded from https://www.commonsenserc.com/RendoInstructionsManualEnglish.pdf on May 16, 2014.
International Search Report for PCT/ER2012/001215 mailed Aug. 8, 2012.
Email from Lawrence A. Baratta, Jr. To Rex A. Donnelly et al., dated Feb. 26, 2015.
Search Report for U.S. Appl. No. 12/698,665, dated Feb. 25, 2015, pp. 1-29.
D. J. Walker, "Multivariable control of the longitudinal and lateral dynamics of a fly-by-wire helicopter," Control Engineering Practice, vol. 11, Issue 7, pp. 781-795 (July 2003).
Rong Xie, et al., "H∞ State Feedback Control for the Stabilization of the Three Euler Angles of Helicopter Based on LMI," 2008 International Conference on Intelligent Computation Technology and Automation, pp. 375-379 (Oct. 2008).
Castillo, et al., "Small Scale Helicopter Analysis and Controller Design for Non-Aggressive Flights," 2005 IEEE Int'l Conf. On Systems, Man and Cybernetics, vol. 4, pp. 3305-3312 (Oct. 2005).

\* cited by examiner

FIG. 7A — Overshoot

FIG. 7B — Stop too early

FIG. 7C — Perfect

MODEL HELICOPTER CONTROL AND RECEIVING MEANS

CROSS REFERENCE TO RELATED APPLICATIONS

This application is related to German Utility Patent Application Reference No. DE 20 2009 001 355 U1. This application was filed on Feb. 4, 2009 and was published Jun. 25, 2009.

FIELD OF INVENTION

This invention relates to a helicopter control and receiving means to be used with model helicopters.

BACKGROUND OF THE INVENTION

Remote helicopter operation requires the control of the helicopter's attitude as well as stabilization effects. Electronic attitude controllers for stabilizing helicopter flight models are known in the art. To control the attitude of the helicopter, the attitude controller for the rotor preferably comprises a control means for the attitude control of at least the longitudinal axis (the axis in the direction of flight, also referred to as the "roll" of the helicopter) and of the transverse axis (the axis horizontal and transverse to the direction of flight, also referred to as the "pitch" of the helicopter). With control of the longitudinal and transverse axes, the position of the rotor of the helicopter is thus controlled or hereby stabilized. As is known in the prior art, the attitude is controlled via the control of the servo drives of the swashplate of the helicopter. In the prior art, traditional methods such as the Bell-Hiller control system, paddle bars, or other like apparatus have been used to stabilize and control the main rotor of the helicopter. Recent developments have made it is possible to completely dispense with mechanical stabilization methods such as the Bell-Hiller control system and paddle bars in the area of the rotor head through the use of electronically controlled swashplates.

Not only do typical helicopter attitude controllers control the roll and pitch of the remote-controlled helicopter, but they also typically receive and process control inputs comprising control commands for controlling the helicopter. These control commands may be sent via a radio transmitter, remote control transmitter, or through a similar method and device. Traditionally, these control inputs are connected to separate, multichannel control outputs of a radio receiver, which provides separate lines for each control channel. In the prior art, each control channel may designate a transmission channel for a control function of the remote-controlled helicopter, for example, channel 1: pitch, channel 2: roll, channel 3: pitch, channel 4: motor speed, channel 5: tail rotor control, channel 6: parameter bank switching. These channels will typically vary between helicopter makes and models and the assignment will be performed in the device's software.

The drawback of the above prior-art helicopter attitude controller systems is that, especially for small remote-controlled helicopter models, the different housings for the sensors and the receiver, including the numerous connecting cables from the receiver to the helicopter attitude controller housing can only be accommodated with great difficulty.

SUMMARY OF THE INVENTION

One aspect of the invention comprises a remote-controlled helicopter control system as well as a remote-controlled helicopter comprising such a control system. In this exemplary embodiment, the control system comprises at least one receiver configured to receive a plurality of control channel signals, including at least one signal comprising a user input signal. The control system also comprises an attitude control unit. The attitude control unit comprises a receiver input connected to the receiver via a single communication link. The receiver input is adapted to process information corresponding to the plurality of control channel signals including at least one user input instruction. The attitude control unit additionally comprises at least one sensor input for receiving at least one sensor input instruction from at least one sensor located on the helicopter, a processor capable of processing the user input instruction and the sensor input instruction, and at least one output for transmitting an output instruction to at least one mechanism for controlling attitude. The single communication link may be a high speed digital link and the receiver may be configured to transmit the information in the form of a sequence of digital packets of information, and the receiver configured to receive the information in the form of a sequence of digital packets of information.

Another aspect of the invention comprises a control system for a remote-controlled device. The control system comprises at least one receiver configured to receive a plurality of control channel signals and an operational control unit. The operational control unit comprises at least one receiver input connected to at least one receiver via a high speed digital link, and configured to receive a sequence of digital packets of information from the receiver containing information relating to the plurality of control channel signals, including at least one user input signal. The operational control unit also comprises at least one sensor input for receiving at a sensor input signal from at least one sensor located on the device and a processor configured to process the user input signal and the sensor input signal. The operation control unit further comprises at least one output for transmitting an output signal to a mechanism for controlling operation of at least one operable feature of device.

Yet another aspect of the invention relates to a method for controlling and stabilizing a remote-controlled helicopter. The method comprising providing a controller programmed with a control algorithm. The control algorithm provides control outputs to one or more mechanisms for controlling the helicopter. The method further comprises providing an automatic tuning facility coupled to the control algorithm is provided. One or more operator input signals and one or more sensor input signals are provided to both the control algorithm and the automatic tuning facility. The automatic tuning facility calculates automatic tuning adjustment parameters based upon the input signals and information from the control algorithm. The automatic tuning adjustment parameters are shared with the control algorithm. The control algorithm calculates output control signals from the input signals and the automatic tuning adjustment parameters. The control algorithm sends the output control signals to one or more mechanisms for controlling the helicopter as well as to the automatic tuning facility.

Still another aspect of the invention relates to a method for controlling a remote-controlled helicopter having at least a tail and a swashplate. In this method, a controller programmed with a swashplate control algorithm for controlling the swashplate and a tail control algorithm for controlling the tail is provided. One or more operator input signals and one or more sensor input signals are provided to both the swashplate control algorithm and the tail control algorithm. The information provided to the swashplate algorithm is shared with the tail control algorithm, and the information provided to the tail control algorithm is shared with the swashplate algorithm. The swashplate algorithm provides output to one or more drives for controlling an aspect of the swashplate and the tail control algorithm provides output to one or more drives for controlling the tail.

Yet another aspect of the invention comprises a method for providing stop support for a controlled portion of a remote-controlled helicopter. The method comprises providing a programmed controller for providing output signals to one or more mechanisms for controlling the portion of the helicopter. The controller is programmed with a stop support algorithm and a learn function, the stop support algorithm programmed to calculate a stop support ratio for use in deriving the output signals during a stop event. The controller is also provided with one or more operator input signals and one or more sensor input signals. Upon receipt of an operator input signal instructing a stop event in which the one or more mechanisms are instructed to stop providing input to the portion of the helicopter, the learn function is initiated to store information corresponding to the one or more operator input signals, the one or more sensor input signals, and the output signals to the one or more mechanisms. Using the programmed controller, the stop support algorithm calculates a series of curves defining the stop event based upon the stored information and characterizing the stop event as an overshoot, an undershoot, or an acceptable stop event. The stop support is decreased in response to characterization of the stop event as an undershoot or increased in response to characterization of the stop event as an overshoot.

BRIEF DESCRIPTION OF THE DRAWINGS

The invention is best understood from the following detailed description when read in connection with the accompanying drawings and diagrams. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the application are the following drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

One of advantage of certain embodiments of the present invention is a reduction in the space requirement required for remote-control devices, such as helicopters, thereby reducing the design effort needed to accommodate new controllers. Another advantage of certain embodiments of the present invention is an expansion in the functional scope of the device controller, thereby providing improved control. These advantages may be achieved through the use of a controller connected directly to a receiver for the input as well as by through the combination of a plurality of control channels into one or more shared control lines. This may be accomplished, for example, by using a three-wire line, in which one line carries a serial digital signal.

While not limited to any particular type of remote controlled vehicle, one embodiment of the present invention pertains to a remote-controlled helicopter control and receiving means in a housing comprising an electronic, gyro-based multi-axial programmable attitude controller. This control and receiving means may be adapted especially for a helicopter attitude controller, which comprises control inputs for a plurality of control channels as well as inputs for gyro signals. The attitude controller provides at least one input for a receiving module, which can be in a separate housing from or integrated within the same housing as the attitude controller. Typically there are 4 Inputs for the basic axis of control of a helicopter: aileron, elevator, collective pitch and tail control. Because the device may replace a traditional receiver, more channels can be routed from satellite receivers to additional outputs of the device. It should be noted here that the term "satellite receivers" refers to receivers located distant from a main receiver, and does not refer to the signals being on a frequency used by telecommunications satellites, for example. The present invention is not limited to any particular type or origin of signals received or transmitted.

Figure 1:
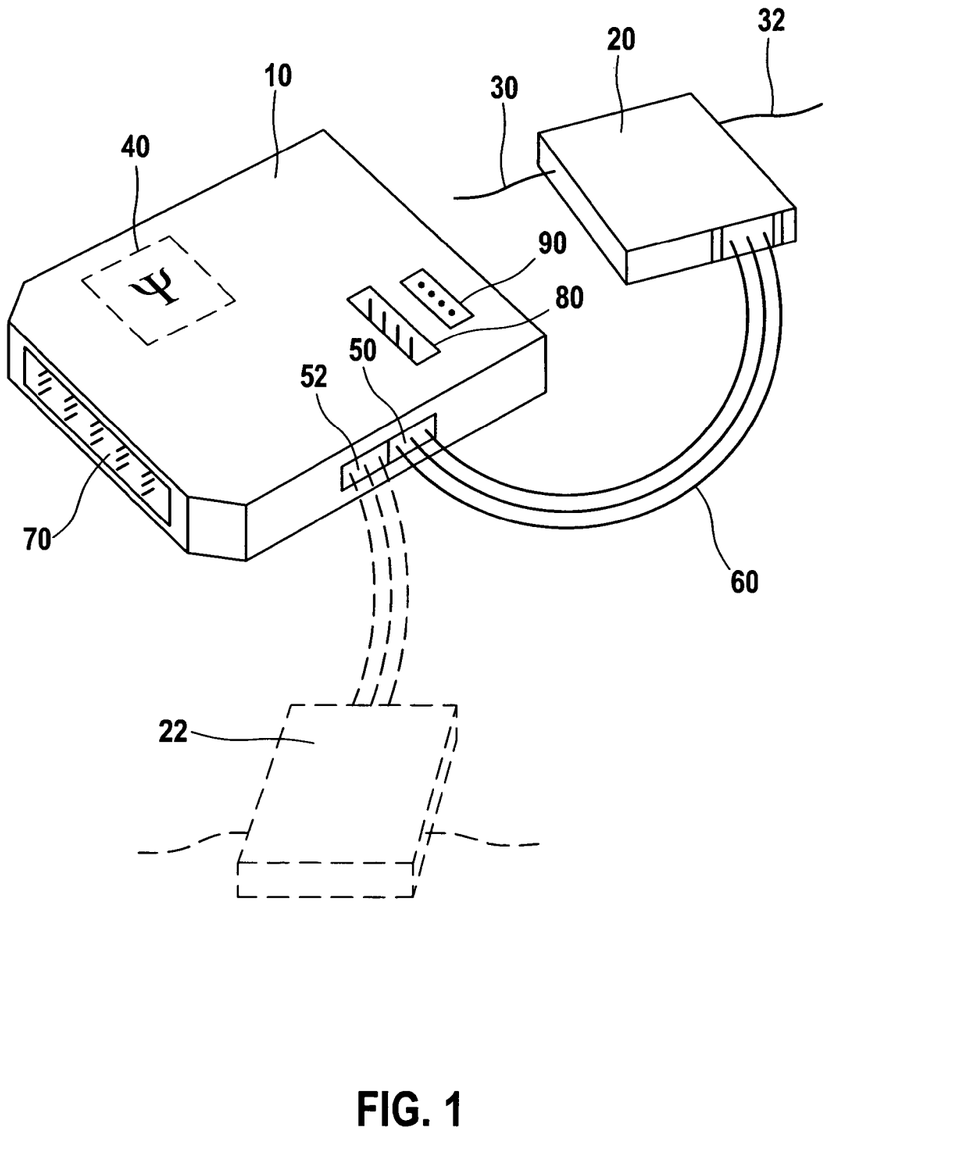
FIG. 1 is a perspective view of an exemplary controller according to an exemplary embodiment of the invention, coupled to a receiver(s)

As shown in FIG. 1, the input for the receiving module is preferably formed by an electrical line connection with a reduced number of single wires, whereby a plurality of control channels are combined on one or more signal lines. FIG. 1 shows the housing 10 of the mini-helicopter attitude controller 10 connected to a 2.4-GHz DSSS satellite receiver 20 with two receiving antennas 30, 32. Although shown with a physical communication link between the controller and the receiver, in an alternate embodiment, the communication link may be a wireless connection. Housing 10 may also include a gyroscope sensor element 40. The helicopter attitude controller housing contains two or three gyro systems (angular rate sensors) arranged vertically to one another. Satellite receiver 20 can be connected to a jack 50 of the housing. Another satellite receiver 22 can be connected to another jack 52 of the housing. The signal line from the receiver 20 to the helicopter attitude controller housing 10 has a three-wire design. Housing 10 has jacks 70 for the power supply and at least 4 RC servos, such as servo drive mechanisms commonly known in the art for use in controlling features of remote control vehicles. Jack 80 may, for example, be used to connect a portable programming device, with which the helicopter attitude controller can be programmed. Jack 90 may, for example, be a USB port configured to receive a USB cable, via which a personal computer may be connected for programming with a programming software and for uploading new firmware or model parameters. Moreover, the helicopter attitude controller may comprise bank switching, via which different stored sets of parameters can be polled.

Figure 2A:
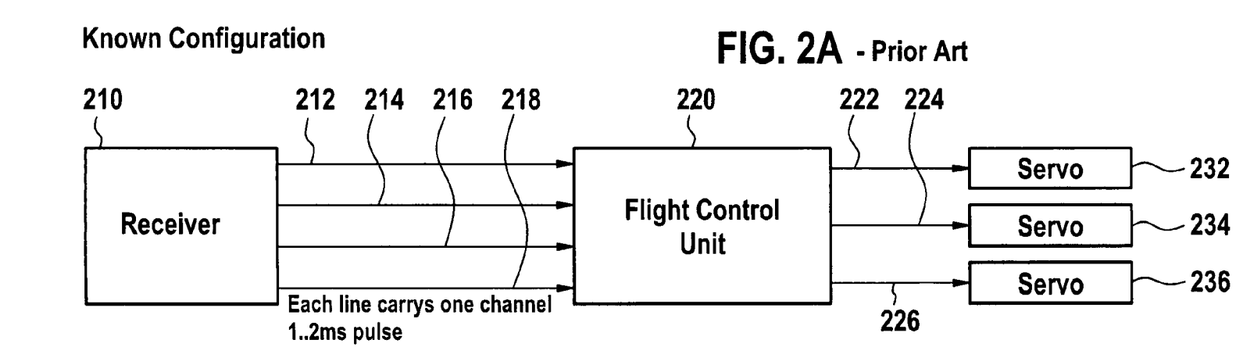
FIG. 2A is a block diagram depicting a receiver and flight control unit configuration of the prior art.

FIG. 2A shows a schematic block diagram of the prior art system controller. In the prior art system receiver 210 is connected to flight control unit 220 through four independent wires 212, 214, 216 and 218. Each independent wire 212, 214, 216, 218 are dedicated wires to the transmission of a singular piece of information from the receiver 210 to the flight control unit 220. Flight control unit 220 then communicates with the helicopters individual servos 232, 234 and 236. Each servo is linked to the flight control unit via wires 222, 224 and 226 respectively.

Figure 2B:
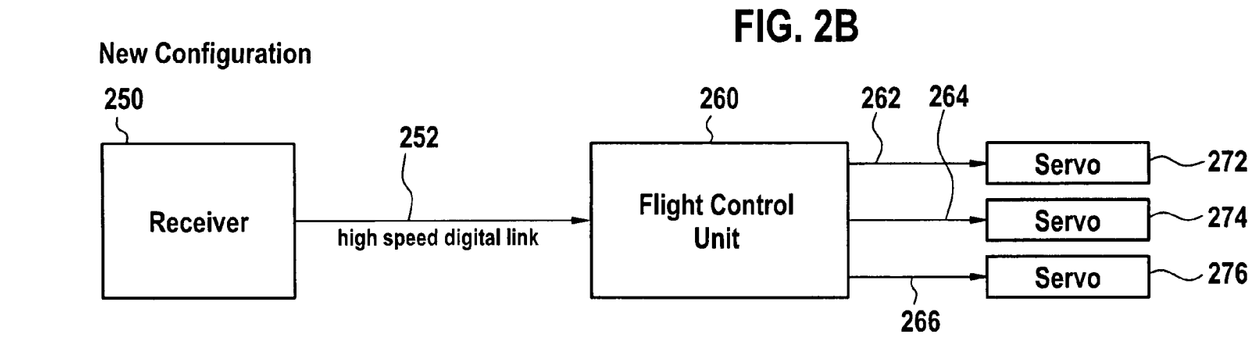
FIG. 2B is a block diagram depicting an exemplary receiver and flight control unit configuration of the present invention.
Figure 2C:
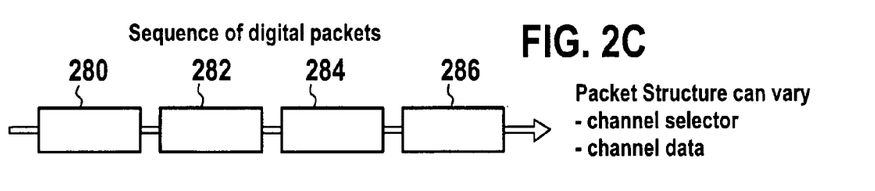
FIG. 2C is a block diagram depicting an exemplary manner in which data is sent via a high speed digital link in accordance with the present invention.

FIG. 2B shows the schematic block diagram for the controller of the present invention. As shown in FIG. 2B, the receiver 250 communicates with the flight control unit 260 through a single high speed digital link 212. Flight control unit 260 then communicates with individual servos 272, 274 and 276 through dedicated wires 262, 264 and 266 respectively. High speed digital link 252 is structured to send all signals from the receiver to the flight control unit as a sequence of digital packets 280, 282, 284 and 286 as shown in FIG. 2C. The packet structure may vary depending on the channel selector or channel data that is being transmitted from the receiver 250 to the flight control unit 260. The use of a single high speed digital link 252 allows for a faster transmission of data, as well as additional security for data transmission. In the prior art, if any of lines 212, 214, 216 or 218 were to break or cease operating, control of the remote-controlled device may be lost, which in the case of a flying device such as a helicopter, may cause it to crash. Although the danger of a broken wire or connection still exists in the present invention, by using a single line the remote-controlled helicopter operator may more easily verify proper connection and inspect the connection for possible breakdowns, and the design may incorporate increased robustness or reliability into the single line and related connectors without adding undue cost or weight to the device. Even more security may be provided using two redundant receivers for receiving the same signal. In such an embodiment, if one of the receivers or one of the communication links between the receiver and the controller malfunctions or is terminated, the second receiver may keep receiving input and transmitting the data to the controller, thereby possibly averting a crash. As depicted, servos 272, 274 and 276 are operated as simple on/off switches and servos 272, 274 and 276 are connected to the swash plate.

According to a first exemplary embodiment of the present invention, the receiving means is arranged with the attitude controller in a separate housing outside the housing, which distributes the reduced cable lines on the output side (satellite receiver). In a second exemplary embodiment of the present invention, the receiving means may be integrated with the attitude control in the housing. Integration of the receiver 20 into the housing 10 may allow for quicker processing time and reduced space on the remote-controlled helicopter thereby allowing for the development of smaller remote-controlled helicopters.

The receiving means 20 in one exemplary embodiment of the present invention may be a 2.4-GHz receiver, which operates according to the frequency spread method (for example, FHSS or DSSS, as outlined by the European Telecommunications Standards Institute (ETSI) Harmonized European Market Standard (Telecommunications Series) EN 300328), such as with a redundant receiving principle such as the use of diversity antennas or a plurality of antennas. Suitable receiving may include but are not limited to Spectrum receivers produced by Horizon Hobby of Champaign, Ill., USA, the Duplex line of receivers produced by Jed model of Příbor, Czech Republic, or receivers such as the Futaba S-Bus receivers marketed through GREAT PLANES® Model Distribution Company of Champaign, Ill., USA, or any other suitable receiver known in the art.

The controller housing 10 preferably has at least one jack or one port for one or two or more satellite receivers as well as at least four jacks for RC servos. These four jacks correspond to the three outputs for the swashplate control and an additional output for the tail control. Furthermore, the housing preferably has a jack or port for a gyro unit for an especially biaxial or tri-axial angular rate sensor, whereby the sensor may also be formed from uni-axial sensors with different orientations, and/or the angular rate sensors are integrated in the housing of the helicopter attitude controller. This gyro jack may be separate from the other jacks or it may be integrated with the other jacks, depending on the design of controller 10.

Furthermore, the housing preferably comprises a jack or port for a programming interface (for example, USB interface or serial interface) and/or a display (not shown), such as is well known in the art, with input interface for programming the apparatus parameters.

Figure 3A:
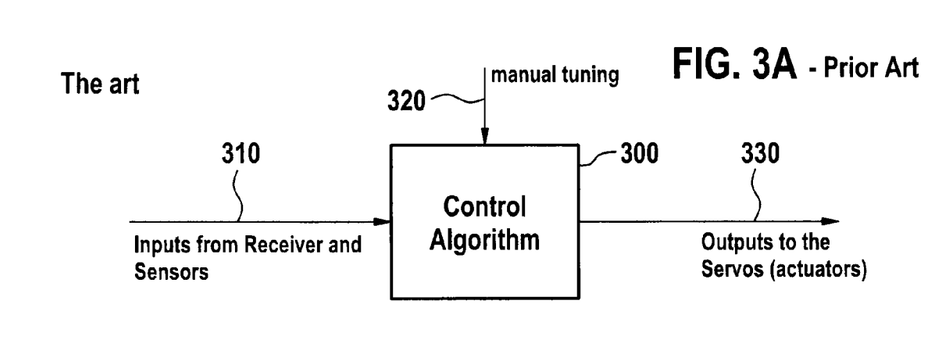
FIG. 3A is a block diagram depicting a control algorithm of the prior art.

According to another preferred embodiment of the present invention, the software for the helicopter attitude controller comprises a self-learning function, typically residing as an algorithm expressed as a set of instructions programmed into a processor or controller via software, hardware, or some combination thereof, which independently determines or further optimizes an adjustment of trim values necessary for the attitude control and/or other set parameters necessary for the attitude control during the flight of the helicopter. As shown in FIG. 3A, in the prior art, the control algorithm 300 receives inputs from the receiver and sensors 310. This input may be relayed back to the operator of the remote-controlled helicopter. The operator then may supplies manual tuning input 320 using a controller (not shown) based on his or her knowledge received from the inputs from the receivers and sensors 310 as well his or her personal experience and knowledge. This manual tuning input 320 is processed by control algorithm 300, which also factors in the inputs from the receiver and sensors 310. The control algorithm then provides output commands 330 to the servos to control the controllable features of the remote controlled helicopter. It should be noted that any number of algorithms may be developed by those skilled in the art to carry out the functions described herein using the inputs and information discussed herein. The invention is not limited to any particular control algorithms, which may vary depending upon the nature of the device to be controlled.

Figure 3B:
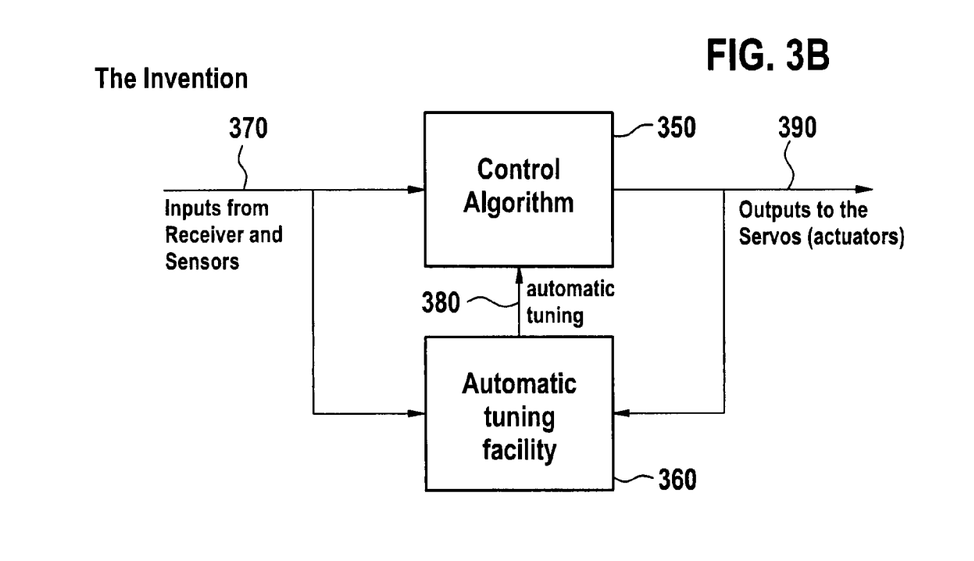
FIG. 3B is a block diagram depicting an exemplary control algorithm and automatic tuning facility of the present invention.

In the present invention, as shown in FIG. 3B, the control algorithm 350 is paired with the automatic tuning facility 360. The automatic tuning facility 360 provides the algorithm with the ability to more quickly determine and adjust the parameters of the control loop. In one embodiment of the present invention, the inputs from the receiver and sensors 370 are sent to both control algorithm 350 and automatic tuning facility 360. Automatic tuning facility 360 receives the operator input acquired from the receiver, as well as any measurements from the sensors, and calculates any automatic tuning 380 parameters. This automatic tuning parameters 380 are then sent to the control algorithm, and the control algorithm outputs the various control signals to the servos 390. This output of the control algorithm may also be sent to the automatic tuning facility 360 to provide the automatic tuning facility 360 with as much input as possible.

The automatic tuning facility 360 may monitor several internal and external signals and derive tuning changes from the history of the monitored signals. Therefore, the reaction of the complete system is optimized over the course of the operation. The automatic tuning facility 306 may evaluate and tune any control variable, including but not limited to, the feed forward, the proportional and integral gains, the zero offsets (also referred to as the trim), the pre-compensation intensities (including the torque and dynamic effects), and the adaptation time for the adaptive control algorithm. Automatic tuning facility 360 may monitor other values as needed. The automatic tuning facility 360 may constantly tune the remote-controlled helicopter, or the automatic tuning facility may be turned off by the user to prevent overtuning of the helicopter.

Figure 4A:
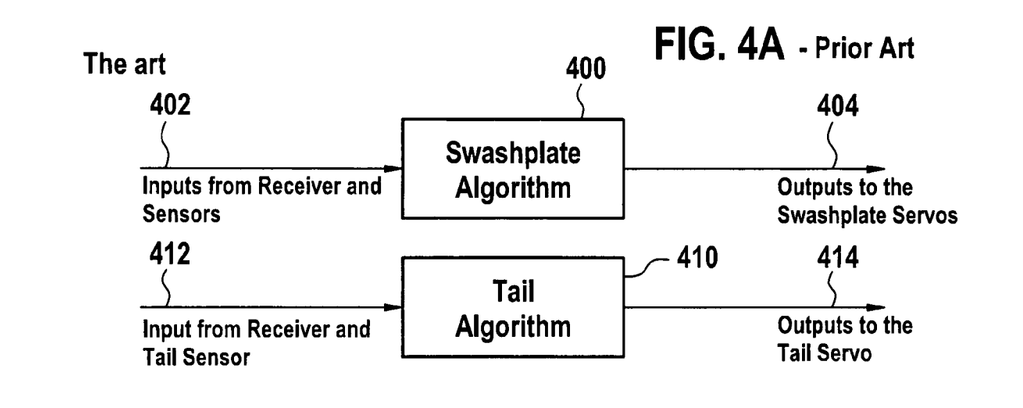
FIG. 4A is a block diagram depicting a swashplate algorithm and the tail algorithm of the prior art.
Figure 4B:
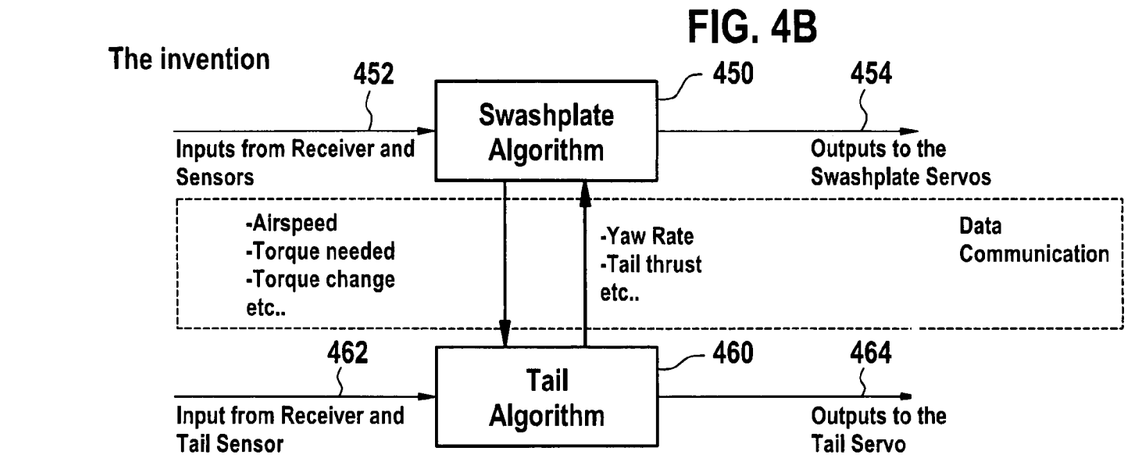
FIG. 4B is a block diagram depicting an exemplary swashplate algorithm and tail algorithm of the present invention.

The control and stabilization of the remote-controlled helicopter is further aided over the prior art as illustrated in FIGS. 4A and 4B. In typical prior art control schemes, inputs from the receiver and sensors 402 are sent to a processor programmed with a swashplate algorithm 400. The programmed swashplate algorithm then processes these inputs, as well as any manual tuning input, and sends the output to the swashplate servos 404. Similarly, the input from the receivers and tail sensors 412 are input to a processor programmed with a tail algorithm 410 and, when combined with manual tuning input, the tail algorithm 410 sends the output to the tail servo 414. Typical prior art swashplate algorithms 400 operate separately and independently from prior art tail algorithms 410.

One embodiment of the present invention, however, eliminates the separate communication. In this embodiment, as illustrated in FIG. 4B, swashplate algorithm 450 and tail algorithm 460 are in constant communication with one another. As shown in the block diagram, the present invention allows the swashplate algorithm 450 to communicate with the tail algorithm 460, thereby sharing data from the inputs from the receiver and sensors 452 as well as the tail sensor 462. The swashplate algorithm and the tail algorithm therefore exchange information such as but not limited to airspeed, torque needed, torque change, yaw rate, tail thrust or any number of other variables. By exchanging these values, the two algorithms may work in tandem to better stabilize the helicopter as well as provide better overall control of the movements of the helicopter.

For instance, in one example the swashplate algorithm 450 may now not only receive the original input from the receiver and the sensors, but also input received from the tail sensor 462 as well as any output actions being sent by tail algorithm 460 to the tail servo 464. Similarly, the tail algorithm may now receive all the information from all the receivers and sensors, as well as any actions that might be outputted by the swashplate algorithm 450 to the swashplate servos 454. This feature allows the helicopter to process information faster, create greater stability for the helicopter, and allow for better control and better responsiveness of the helicopter.

Figure 5:
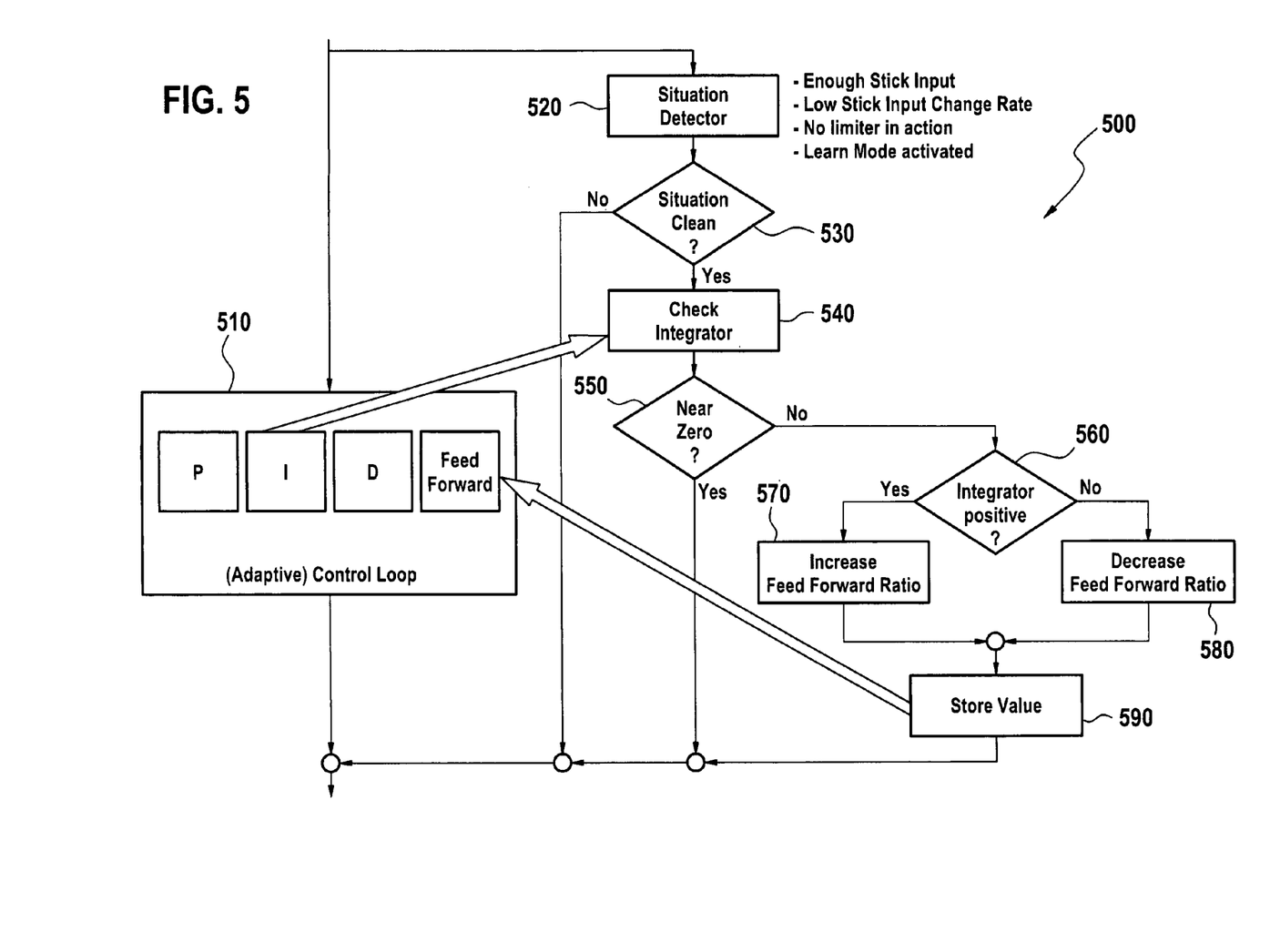
FIG. 5 is a block diagram depicting an exemplary adaptive control loop comprising an exemplary algorithm for controlling the feed-forward ratio, further illustrating an exemplary automatic learning feature of the present invention.

According to another embodiment, the helicopter attitude controller also comprises an additional control of the vertical axis (vertical axis in the yaw direction). In a helicopter model, the attitude of the model in the direction of the vertical axis is usually influenced or determined by the tail rotor. Since the adjustment of the position of the tail rotor is especially difficult in helicopter models, usually a high-quality controller is used for the tail gyro system according to an integral control principle (heading hold), which is preferably integrated in the helicopter attitude controller. In a gyro system according to the integral control principle, as is well known, a control signal for the tail is processed such that the gyro holds the tail, for the most part, in the position that was set by the control signal. This may mitigate the "weathervane effect" experienced when the tail of the helicopter is blown from side to side by cross-winds. According to one embodiment, the tail controller is expanded, compared to conventional tail controllers, by being in communication with the non-tail related controllers (as shown in FIG. 4B). In the exemplary embodiment, the swashplate algorithm communicates directly with the tail algorithm, providing additional functionality. This communication may be provided by the non-integrated tail gyro and swashplate gyro systems in the helicopter attitude controller because of the additionally available signals of the helicopter attitude controller. This communication improves the quality of the tail gyro system because of these additional functions. According to one embodiment, the helicopter attitude controller thus comprises a heading-hold controller for the vertical axis, which comprises a signal connection to the controller for the longitudinal and transverse axes and/or a signal connection to the control inputs, so that the heading hold controller can react earlier provide suitable control intervention to counteract movements in the direction of the vertical axis, for example, from torque fluctuations caused by control signals and/or control interventions in connection with the longitudinal and transverse axis and/or cyclical control signals As discussed above, the present invention may contain an adaptive control loop that is capable of making adjustments to the swashplate servos and tail servo to assist in stabilizing the remote-controlled helicopter. An exemplary embodiment of the self-learning software is shown is shown in FIG. 5. In FIG. 5, block 500 illustrates an exemplary controlled programmed with a suitable algorithm to adjust the forward feed of the remote-controlled helicopter. The algorithm starts at step 510 with adaptive control loop 510. The adaptive control loop 510 first assesses status in a situation detector step 520. The algorithm is programmed to determine the status of the remote-controlled helicopter system, looking at such factors as whether there is enough stick input, whether there is a low stick input change rate, whether there is no limiter in action, whether the self-learning mode has been switched on or off, or any other number of factors. Once the algorithm determines the status, it proceeds to step 530 to determine if the situation is "clean." The system is considered "clean" when there is no change in input from the user. Thus, if the user has not modified his input, the situation is determined to be clean and the algorithm continues to step 540. If the situation is not clean, because the user has modified his or her input, the loop will return to the adaptive control loop 510 and the program will reinitiate the analysis. Once the algorithm moves to step 530, the program will then check the integrator at step 540. If the integrator for the value being analyzed is near zero at step 550, the program will once again reinitiate back to the adaptive control loop. The determination of what qualifies as a "near zero" integrator value may be determined by the user and preprogrammed into the software, or default values may be used. These default values may be set by the remote-controlled helicopter manufacturer. If, however, the integrator is determined to not be near zero at step 550, the algorithm then progresses to step 560 and determines if the integrator value is positive or negative. If the integrator value is positive, the program will move to step 570 and increase the forward feed. If the integrator value is negative, the program will move to step 580 and decrease the forward feed. This new forward feed will then be stored at step 590 in the adaptive control loop. By storing the value at step 590, the adaptive control loop will be able to compare future sensor readings and user inputs to the stored forward feed and thereby make adjustments for the remote-controlled helicopter quicker and more accurately.

Figure 6:
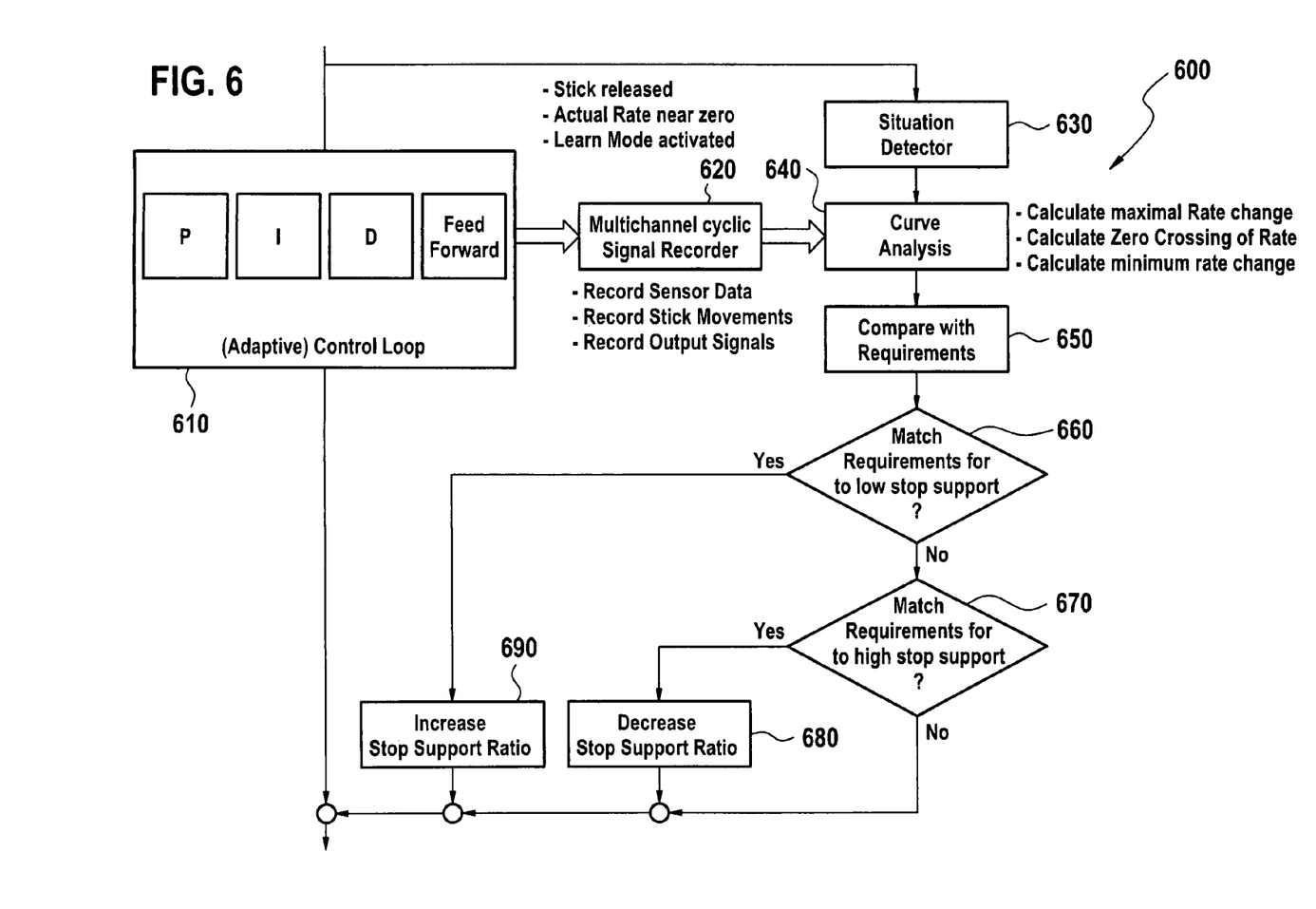
FIG. 6 is a block diagram depicting an exemplary adaptive control loop comprising an exemplary algorithm for controlling and stabilizing the rate of change of the direction of a remote-controlled helicopter, further illustrating an exemplary automatic learning feature of the present invention.

FIG. 6 is a block diagram depicting an adaptive control loop illustrating an exemplary algorithm 600 utilized to help stop one or more drivers controlling a portion of a remote-controlled helicopter. When a user is satisfied with the user inputs made to some aspect of the remote-controlled helicopter system, the user typically lets the control stick corresponding to such inputs come to rest its natural position in a no-input condition which there is no user manipulation of the stick. This defines a stop event which is assisted by exemplary algorithm 600, which provides a stop support ratio to assist stopping any changes in input to the system. Stop support provides a feed-forward instruction curve to the relevant set of controllers, as derived from the control input in combination with the output of the control loop. The curve is shaped to eliminate overshoot or undershoot when the relevant portion of the system is instructed to stop providing input. The intensity of the signal may be adjusted depending on environmental influences, such as dampening factors of the rotor system, airfoils of the blades, and other such factors. Adjusting this intensity is a purpose of algorithm 600.

When the user is providing a command to the helicopter using the control stick, algorithm 600 is inactive. Algorithm 600 initiates at step 630 by activating the learn mode when the user releases the remote control stick, signaling a desire that the associated drivers controlled by the stick should stop providing input to the system. Initiation of the algorithm causes transmission of all data in step 620 to the multi-channel cyclical signal recorder. Sensor data collected by all of the sensors attached to the controller, stick movements input by the user, and output signals that are eventually output to the various servos for maneuvering the remote-controlled helicopter are stored. The algorithm uses this information to determine if there was overshoot or undershoot, and to generate the control curve to handle a similar stop the next time the controller is faced with similar input information from the user and the sensors, allowing the program to provide more accurate output to the servos more quickly to provide stoppage at the desired rate.

As shown in FIG. 6, the exemplary algorithm calls for an evaluation of system status at step 630. The algorithm checks data indicating whether the control stick is released, whether the actual rate is near zero, and whether the learn mode is activated. When the prerequisite conditions are met, the algorithm advances to step 640 and performs a curve analysis. To perform the curve analysis, the program calculates the maximum rate change, the zero crossing of the rate, and the minimum rate change from the input provided by the sensors, as further discussed below. The algorithm then moves to step 650 where the calculated maximum rate change, the zero crossing of the rate and the minimum rate change are compared with the requirements for the helicopter at that time. When the algorithm compares these values, it determines at step 660 whether the calculated values match the requirements for low stop support. If so, the algorithm skips to step 690 and increases the stop support ratio. If the calculated values do not match the requirements for low stop support, the program proceeds to step 670 and determines whether the calculated values match the requirements for high stop support. If the calculated values match the requirements for high stop support, the algorithm decreases the stop support ratio at step 680. If the calculated values do not meet the requirements for high stop support or low stop support, no changes are made to the stop support ratio. The requirements for the stop support ratio may be preprogrammed by the manufacturer of the remote-controlled helicopter, or the requirements may be programmed into the adaptive control loop by the user.

Figure 7A:
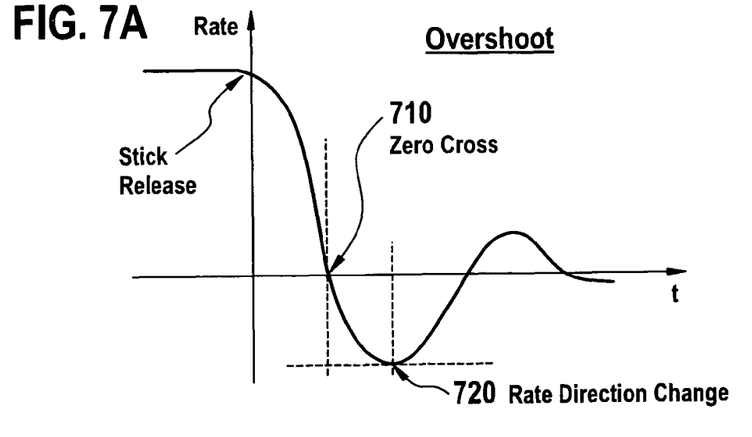
FIG. 7A is a graph depicting an exemplary zero crossing rate in which a driver of a portion of the remote-controlled helicopter overshoots a designated stopping point.
Figure 7B:
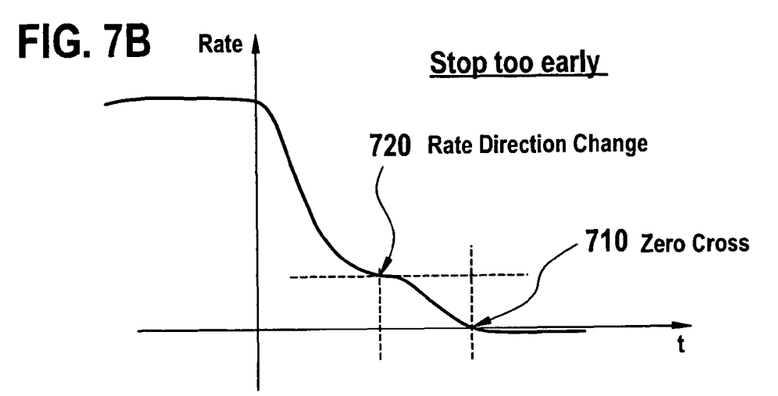
FIG. 7B is a graph depicting an exemplary zero crossing rate in which a driver of a portion of the remote-controlled helicopter stops too early.
Figure 7C:
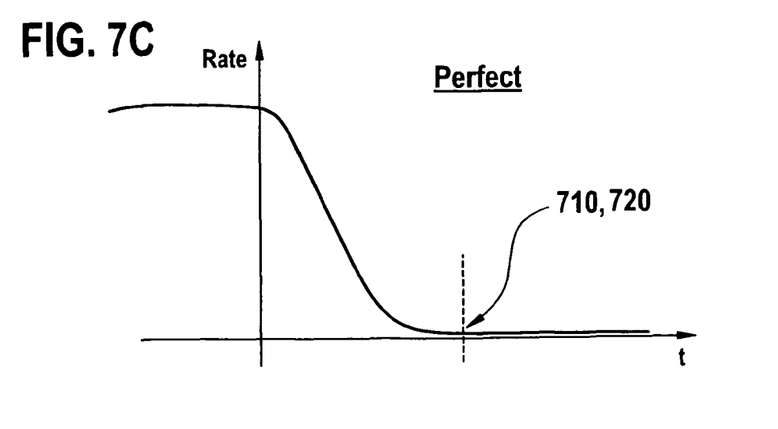
FIG. 7C is a graph depicting an exemplary zero crossing rate in which a driver of a portion of the remote-controlled helicopter stops at the appropriate time.

FIGS. 7A-7C show an exemplary set of curves that may be produced at step 640 of the above algorithm. The curve analysis step calculates two values from the trace of the most recent stop attempt: 1) the first zero crossing of the rate signal after stick release; and 2) the first direction change of the rate signal after the stick release. In FIGS. 7A and 7B, the first zero crossing of the rate signal after stick release is marked as 710. Similarly, the first direction change of the rate signal after the stick release is marked as 720.

FIG. 7A shows a representative graph of the curve analysis for a curve that shows a stop with overshooting. If no stop support is given, the attempted stop curve for the drive may resemble this graph, which depicts the rate of the drive slowing down but failing to stop at the zero rate. Rather the drive overshoots the stop position and requires the control loop to correct in the opposite direction. Relying on the control loop to correct overshooting takes a much longer time than is possible with the use of an algorithm such as shown in 600. If this is situation occurs, as determined by the algorithm in steps 640 and 650, the stop support ratio is increased at step 690, so that next time the stoppage is accelerated in response to user input signaling a stop event.

Conversely, FIG. 7B depicts a situation in which too much stop support is provided (undershooting). In this case the rate change direction occurs before the zero crossing, meaning that the control loop had to provide additional corrective signals to achieve the desired result. Just like when the helicopter overshoots the stop position, correcting undershooting through the use of only the control loop is much slower than correcting undershooting using an algorithm such as shown in 600. This situation calls for the stop support ratio to be decreased at step 680. Finally, FIG. 7C shows a perfect stop in which both the rate direction change and the zero cross occur at precisely the same time, as assisted with the above-described algorithm.

In addition to the conditions discussed above in relation to FIGS. 4-6, values calculated by a self-learning algorithm may include but are not limited to: airspeed adapted to the gain of the tail algorithm; torque calculated from the deflection of the blades as output to the tail actuator (also known as the torque compensation); changes in torque calculated as output to the tail actuator (also known as the dynamic torque compensation); yaw rate calculation and rotation of the coordinate system of the swashplate algorithm (also known as pirouette optimization); and tail thrust value calculation and output to the swashplate to compensate for any resulting effects on the cyclic axes.

While preferred embodiments of the invention have been shown and described herein, it will be understood that such embodiments are provided by way of example only. For example, certain aspects of the invention may be relevant to control of any radio controlled vehicle, including model or full-sized vehicles, not limited to helicopters. Certain embodiments may incorporate only one, more than one, or all of the features and functions discussed herein. Aspects of the invention may include any devices programmed with instructions to carry out the functions discussed herein, including programmed computers or other processors programmed in hardware, software, or some combination thereof. Accordingly, references to algorithm steps discussed herein may refer to steps carried out by any machine programmed with a suitable algorithm. The invention includes not only machines programmed to carry out such steps, but also storage media embedded with instructions for carrying out the identified steps. It should also be understood that embodiments of the present invention may constitute control systems for controlling suitable devices, such as remote-controlled helicopters, whether sold separately or integrated into such devices, including but not limited to remote controlled helicopters comprising such control systems; processors or storage media programmed with instructions for carrying out the algorithms described herein; and methods for remotely controlling devices, such as but not limited to remote-controlled helicopters as discussed herein. Numerous variations, changes and substitutions will occur to those skilled in the art without departing from the spirit of the invention. Accordingly, it is intended that the appended claims cover all such variations as fall within the spirit and scope of the invention.

What is claimed:

1. A remote-controlled model helicopter and controller system, wherein the remote-controlled model helicopter comprises at least a tail, a tail rotor for controlling yaw of the model helicopter, a main rotor, and a swashplate for controlling the main rotor to control both pitch and roll of the model helicopter, said controller system comprising:
    at least one receiver located on the remote-controlled model helicopter configured to receive a plurality of control channel signals, including a plurality of user input instruction signals comprising information corresponding to a plurality of user input instructions, each instruction designated to instruct one of a plurality of mechanisms for controlling at least one aspect of the remote controlled model helicopter;
    an attitude control unit located on the remote-controlled model helicopter, optionally contained within a control system housing, said attitude control unit comprising:
        a receiver input configured to be connected to said receiver via only a single communication link, said receiver input adapted to process said information through said single communication link, said communication link comprising a high-speed digital link;
        at least one sensor input for receiving at least one sensor input signal from the at least one sensor, the at least one sensor input signal corresponding to at least one sensor input value,
        a processor capable of processing said plurality of user input instructions and said at least one sensor input value, said processor programmed with one or more control algorithms for generating output instructions, and
        a plurality of outputs for transmitting the output instructions to a plurality of mechanisms for controlling attitude; and
    at least one sensor located on the remote-controlled model helicopter, optionally contained within the control system housing, the at least one sensor comprising an angular rate sensor;
    wherein said control algorithms comprise at least a swashplate algorithm for generating output instructions for the swashplate for controlling both pitch and roll of the RC model helicopter and a tail control algorithm for generating output instructions for the tail rotor for controlling yaw of the RC model helicopter, said swashplate algorithm and said tail control algorithm each configured to provide information to the other control algorithm.

2. The remote-controlled model helicopter and controller system of claim 1, further comprising the plurality of mechanisms for controlling attitude connected to the attitude control unit, at least one of the plurality of mechanisms for controlling attitude comprising a servo drive.

3. The remote-controlled model helicopter and controller system of claim 1, wherein said communication link comprises a high-speed digital link and said receiver is configured to transmit information from the receiver in the form of a sequence of digital packets of information and said control unit is configured to receive information from the receiver in the form of the sequence of digital packets of information.

4. The remote-controlled model helicopter and controller system of claim 1, wherein said at least one receiver is located in a separate housing from said attitude control unit.

5. The remote-controlled model helicopter and controller system of claim 1, wherein said at least one receiver is integrated into the same housing as said attitude control unit.

6. The remote-controlled model helicopter and controller system of claim 1, wherein said at least one receiver operates with a redundant receiving principle.

7. The remote-controlled model helicopter and controller system of claim 1, wherein said at least one receiver is a 2.4 GHz receiver.

8. The remote-controlled model helicopter and controller system of claim 1, wherein said attitude control unit comprises three outputs to three different attitude servos.

9. The remote-controlled model helicopter and controller system of claim 1, further comprising said at least one sensor, wherein the at least one sensor comprises a biaxial or tri-axial angular rate sensor.

10. The remote-controlled model helicopter and controller system of claim 9, wherein the at least one sensor is integrated into the same housing as the attitude control unit.

11. The remote-controlled model helicopter and controller system of claim 1 further comprising at least one input for a programming interface.

12. The remote-controlled model helicopter and controller system of claim 1 further comprising a display.

13. The remote-controlled model helicopter and controller system of claim 12, wherein said display further comprises an input interface for programming apparatus parameters.

14. The remote-controlled model helicopter and controller system of claim 1, wherein said processor is configured to receive one or more input signals from each of at least one attitude control sensor and at least one tail control sensor.

15. The remote-controlled model helicopter and controller system of claim 14, wherein said processor is further configured to process said plurality of user input instruction signals, said one or more input signals from said at least one attitude control sensor and said one or more input signals from said at least one tail control sensor to calculate adjustments to the attitude and tail control of the remote-controlled model helicopter and to output said adjustments to mechanisms for controlling the attitude and the tail.

16. The remote-controlled model helicopter and controller system of claim 1, further comprising an automatic tuning facility coupled to at least one of said one or more control algorithms for generating output instructions, and in which one or more of the plurality of user input instructions and the at least one sensor input value are in communication with both said at least one of said one or more control algorithms and said automatic tuning facility, wherein:

said automatic tuning facility is configured to:
calculate automatic tuning adjustment parameters based upon said one or more user input instructions and at least one sensor input value and information from said at least one of said one or more control algorithms, and
share said automatic tuning adjustment parameters with said at least one of said one or more control algorithms; and said at least one of said one or more control algorithms is configured to:
calculate output control signals from said one or more user input instructions and at least one sensor input value and said automatic tuning adjustment parameters, and
send said output control signals to one or more of the plurality of mechanisms for controlling attitude and to said automatic tuning facility.

17. The remote-controlled model helicopter and controller system of claim 1, wherein provides swashplate algorithm output instructions to the tail control algorithm and said tail control algorithm provides tail algorithm output instructions to said swashplate algorithm.

18. The remote-controlled model helicopter and controller system of claim 1, wherein the remote-controlled model helicopter has a controlled portion and one or more of the plurality of mechanisms for controlling attitude is configured to control the controlled portion, said remote-controlled model helicopter controller system attitude control unit programmed with a learn function and a stop support algorithm for the controlled portion, said attitude control unit configured to receive said at least one sensor input value in addition to the plurality of user input instructions and further configured to:

provide output signals to the one or more mechanisms configured to control the controlled portion of the remote-controlled model helicopter
calculate a stop support ratio for use in deriving the output signals during a stop event;
initiate the learn function to store information corresponding to the plurality of user input instructions, the at least one sensor input value, and the output signals to the one or more mechanisms configured to control the controlled portion, upon receipt of information relating to an operator user input instruction signal instructing a stop event in which the one or more mechanisms configured to control the controlled portion are instructed to stop providing input to the portion of the remote-controlled model helicopter;
calculate, using said stop support algorithm, a series of curves defining the stop event based upon said information stored by the learn function;
characterize the stop event as an overshoot, an undershoot, or an acceptable stop event; and
decrease the stop support ratio in response to characterization of the stop event as an undershoot or to increase the stop support ratio in response to characterization of the stop event as an overshoot.

19. The remote-controlled model helicopter and controller system of claim 1, wherein at least one receiver, the at least one sensor, and the attitude control unit are all integrated within a common housing.

20. The remote-controlled model helicopter and controller system of claim 19, wherein the common housing comprises at least one jack for receiving a connector for connecting the at least one output of the attitude controller to the at least one of the plurality of mechanisms for controlling attitude.

21. The remote-controlled model helicopter and controller system of claim 1, wherein the at least one receiver comprises two redundant receivers for receiving the same plurality of user input instruction signals.

22. The remote-controlled model helicopter and controller system of claim 1, wherein the single communication link is a wired communication link.

23. A remote-controlled model helicopter and controller system, wherein the remote-controlled model helicopter comprises at least a tail, a tail rotor for controlling yaw of the model helicopter, a main rotor, and a swashplate for controlling the main rotor to control both pitch and roll of the model helicopter, said controller system comprising:

at least one communications receiver located on the remote-controlled model helicopter configured to receive a plurality of control channel signals, including information corresponding to a plurality of user input instructions each designated to instruct one of a plurality of mechanisms for controlling the remote controlled model helicopter, including at least one swashplate control mechanism and one tail control mechanism;
at least one sensor located on the remote-controlled model helicopter;
an attitude control unit located on the remote-controlled model helicopter, said attitude control unit comprising:
a receiver input adapted to process said user input instructions received from the receiver,
at least one sensor input for receiving at least one sensor input signal from the at least one sensor,
a processor capable of processing said user input instructions and said at least one sensor signal, said processor programmed with one or more control algorithms for generating output instructions, and
a plurality of outputs for transmitting the output instructions to the plurality of mechanisms for controlling the remote controlled model helicopter; and
a single high-speed digital communication link connecting the receiver to the receiver input of the attitude control unit, wherein said receiver is configured to transmit said information corresponding to the plurality of user input instructions in the form of a sequence of digital packets of information transmitted over said single high-speed digital communication link, and said receiver input is configured to receive and process said information corresponding to the plurality of user input instructions in the form of the sequence of digital packets of information transmitted over said single high-speed digital communication link;
wherein said control algorithms comprise at least a swashplate algorithm for generating an output for the at least one swashplate control mechanism and a tail control algorithm for generating an output for the at least one tail control mechanism, said swashplate algorithm and said tail control algorithm each configured to provide information to one another.

24. The remote-controlled model helicopter and controller system of claim 23, further comprising a housing for containing at least the attitude control unit.

25. The remote-controlled model helicopter and controller system of claim 24, wherein the housing further contains the sensor.

26. The remote-controlled model helicopter and controller system of claim 24, wherein the housing further contains the communications receiver.

27. The attitude control unit of claim 26, further comprising an attitude control unit housing for containing said control unit.

28. The attitude control unit of claim 27, wherein the at least one sensor is an angular rate sensor.

29. The remote-controlled model helicopter and controller system of claim 23, wherein the swashplate algorithm provides swashplate algorithm output instructions to the tail control algorithm and the tail control algorithm provides tail algorithm output instructions to the swashplate algorithm.

30. A remote-controlled model helicopter attitude control unit, said control unit comprising:
- a receiver input configured to be connected to a receiver via only a single communication link, said receiver input configured to receive via said single communication link and to process a plurality of control channel signals, including a plurality of user input instruction signals comprising information corresponding to user input instructions, each instruction designated to instruct one of a plurality of mechanisms for controlling at least one aspect of a remote controlled model helicopter, said receiver input configured to receive and process information corresponding to the plurality of user input instructions in the form of the sequence of digital packets of information transmitted over said single high-speed wired digital communication link;
- at least one sensor input for receiving at least one sensor input signal from at least one sensor configured to sense at least one characteristic of the remote controlled model helicopter;
- a processor capable of processing said user input instructions and said at least one sensor input signal, said processor programmed with one or more control algorithms for generating output instructions, and
- a plurality of outputs for transmitting the output instructions to a plurality of mechanisms for controlling attitude;
- wherein said control algorithms comprise:
  - at least a swashplate algorithm for generating output instructions for at least one swashplate control mechanism of the remote controlled model helicopter for controlling both pitch and roll of the model helicopter, and
  - at least a tail control algorithm for generating output instructions for at least one tail control mechanism of the remote controlled model helicopter for controlling yaw of the remote controlled model helicopter,
  - said swashplate algorithm and said tail control algorithm each configured to provide information to one another.

31. The attitude control unit of claim 30, further comprising the at least one sensor, wherein at least one sensor is located within the attitude control unit housing.

32. The attitude control unit of claim 30, wherein the attitude control unit housing further comprises one or more jacks connected to the inputs or outputs of the control unit and configured to receive a connector attached to a signal-carrying cable.

33. The attitude control unit of claim 30, further comprising the receiver, wherein the receiver is contained in a receiver housing separate from the attitude control unit housing, and the receiver is connected to the receiver input of the attitude control unit by a signal carrying cable.

34. The attitude control unit of claim 30, further comprising the receiver, wherein the receiver is located within the attitude control unit housing.

35. The remote-controlled model helicopter and controller system of claim 30, wherein the swashplate algorithm provides swashplate algorithm output instructions to the tail control algorithm and the tail control algorithm provides tail algorithm output instructions to the swashplate algorithm.

\* \* \* \* \*

UNITED STATES PATENT AND TRADEMARK OFFICE
CERTIFICATE OF CORRECTION

| | | |
|---|---|---|
| PATENT NO. | : 9,056,259 B2 | Page 1 of 1 |
| APPLICATION NO. | : 12/698665 | |
| DATED | : June 16, 2015 | |
| INVENTOR(S) | : Ulrich Röhr | |

It is certified that error appears in the above-identified patent and that said Letters Patent is hereby corrected as shown below:

On the Title Page, page 2, item [56], References Cited:

U.S. PATENT DOCUMENTS

"1,314,747 A1" should read --13/147,475 A1--.

OTHER PUBLICATIONS

"Adaptive Flight – 13 Unmanned Aerial Vehicle Guidance, Navigation, and Control Systems, ..." should read --Adaptive Flight – Unmanned Aerial Vehicle Guidance, Navigation, and Control Systems, ...--.

"International Search Report for PCT/ER2012/001215 mailed August 8, 2012" should read --International Search Report for PCT/EP2012/001215 mailed August 8, 2012--.

In the Claims

At column 13, line 25 of the Letters Patent, in claim 17 (original claim 22), "...wherein provides swashplate algorithm output..." should read --...wherein said swashplate algorithm provides swashplate algorithm output...--.

Signed and Sealed this
Tenth Day of November, 2015

Michelle K. Lee
*Director of the United States Patent and Trademark Office*